United States Patent
Chandran et al.

(10) Patent No.: US 9,626,049 B2
(45) Date of Patent: Apr. 18, 2017

(54) CAPACITIVE TOUCH SCREEN INCLUDING A FIRST SENSOR PATTERN FOR MUTUAL SENSING AND A SECOND SENSOR PATTERN FOR SELF SENSING

(71) Applicant: STMicroelectronics Asia Pacific Pte Ltd, Singapore (SG)

(72) Inventors: Praveesh Chandran, Singapore (SG); Chee Yu Ng, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 230 days.

(21) Appl. No.: 14/269,295

(22) Filed: May 5, 2014

(65) Prior Publication Data

US 2015/0317008 A1    Nov. 5, 2015

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 2203/04101* (2013.01)

(58) Field of Classification Search
CPC ............ G06F 2203/04101; G06F 1/16; G06F 3/0416; G06F 3/044
See application file for complete search history.

(56) References Cited

U.S. PATENT DOCUMENTS

| | | | | |
|---|---|---|---|---|
| 8,804,056 B2* | 8/2014 | Chang | ............... | G06F 3/0412 345/174 |
| 9,122,088 B2* | 9/2015 | Omote | ............... | G06F 3/044 |
| 2015/0109235 A1* | 4/2015 | Chae | ............... | G06F 3/0416 345/174 |
| 2015/0145802 A1* | 5/2015 | Yao | ............... | G06F 3/0416 345/174 |

* cited by examiner

*Primary Examiner* — Abbas Abdulselam
(74) *Attorney, Agent, or Firm* — Gardere Wynne Sewell LLP (57) ABSTRACT

A capacitive touch panel includes a first sensor pattern and second sensor pattern. The first sensor pattern supports mutual-capacitance detection and the second sensor pattern supports self-capacitance detection. The first sensor pattern includes row conductors and column conductors which intersect each other at mutual-capacitance sensing locations. The second sensor pattern includes island conductors. The island conductors are grouped in clusters of conductors, each cluster providing a self-capacitance sensing location. Control circuitry coupled to the first and second sensor patterns functions to make touch/hover position detections by sensing changes in capacitance at the mutual-capacitance and self-capacitance nodes. The row and column conductors include openings, and the island conductors are positioned in vertical alignment with corresponding openings in the conductors.

17 Claims, 6 Drawing Sheets

CAPACITIVE TOUCH SCREEN INCLUDING A FIRST SENSOR PATTERN FOR MUTUAL SENSING AND A SECOND SENSOR PATTERN FOR SELF SENSING

FIELD OF THE INVENTION

The present disclosure generally relates to capacitive touchscreen panels and, more particularly, to a sensor pattern for use in a capacitive touchscreen panel.

BACKGROUND

Touchscreen panels are typically incorporated in various electronic devices to detect a user input (i.e., user touch or hover) and to display content. The touchscreen panels include an active portion capable of detecting the user touch/hover and displaying content. This active portion is typically formed from a display panel on top of which a capacitive sensing panel is provided which includes multiple layers of capacitive sensing circuitry arranged in a pattern.

Figure 1:
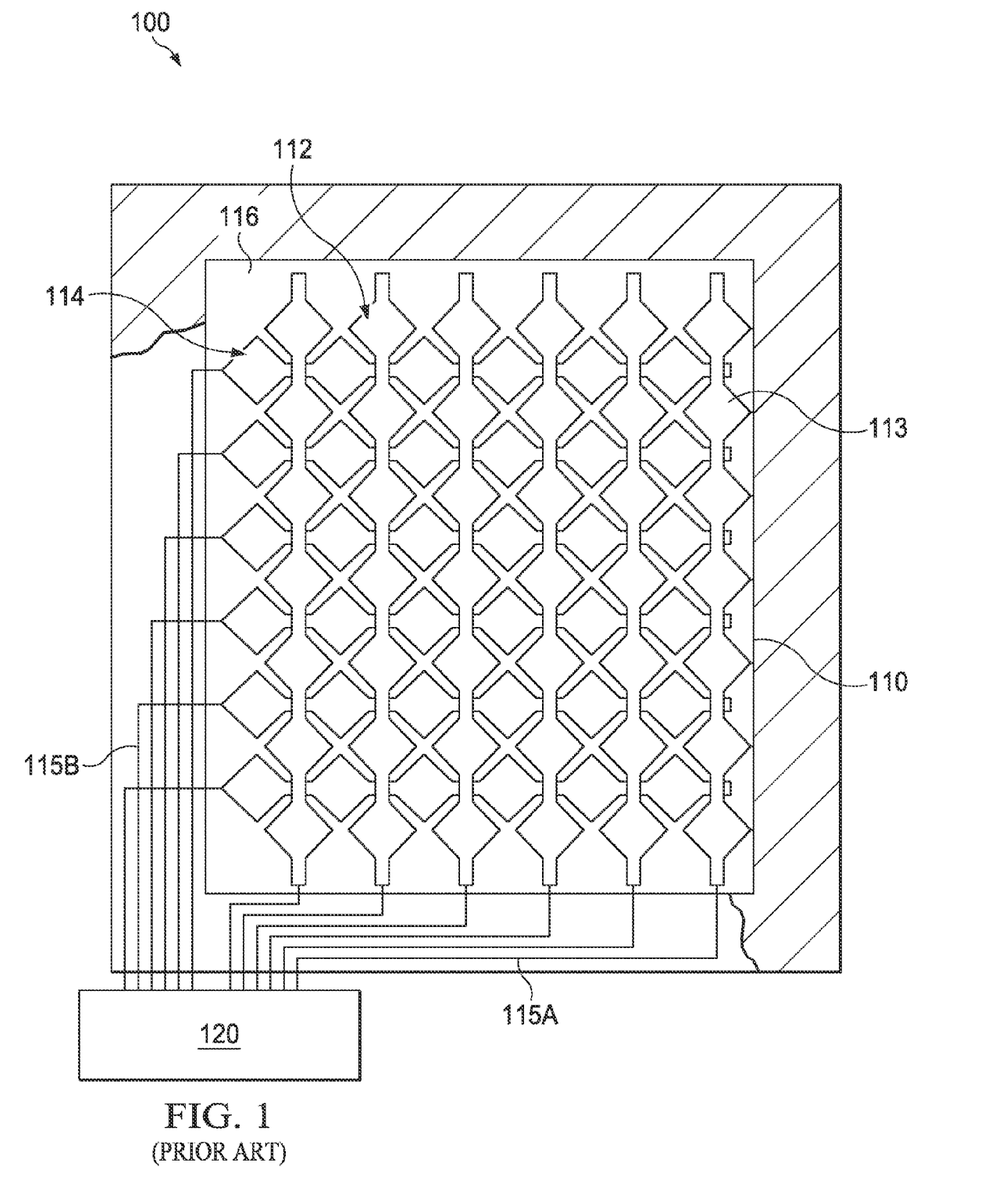
FIG. 1 illustrates a prior art capacitive sensing panel of touchscreen.

FIG. 1 illustrates a prior art capacitive sensing panel 100 utilizing a conventional diamond-shaped pattern. The capacitive sensing panel 100 is of a type which is typically provided in a touchscreen panel for an electronic device such as a smart phone, GPS device, tablet computer, mobile media player, remote control device, or any other device capable of using a touchscreen panel. The sensing panel 100 includes an active portion 110 including a sensor pattern configured to assist in the detection of a user touch or hover (for example, through a finger or other body part as well as through a tool such as a stylus). The touchscreen panel 100 is formed from multiple ITO layers, namely, first ITO layer 112 and second ITO layer 114, disposed within the perimeter of the active portion 110. The first and second ITO layers 112 and 114 are separated by a dielectric layer 116. The first ITO layer 112 is patterned to include columns of interconnected capacitive-sensing nodes 113, and a first layer of traces 115A coupled to each column of capacitive-sensing nodes 113 in the first ITO layer 112. The interconnected nodes 113 of any one column are isolated from the interconnected nodes 113 of any adjacent column. The second ITO layer 114 is patterned to include rows of interconnected capacitive-sensing nodes 113, and a second layer of traces 115B coupled to each row of capacitive-sensing nodes 113 in the second ITO layer 114. The interconnected nodes 113 of any one row are isolated from the interconnected nodes 113 of any adjacent row.

In the illustrated implementation, the interconnected nodes 113 have a diamond shape formed by a square rotated by forty-five degrees which allows for an interleaving of the row and column patterns to occupy a large surface area of the active portion 110. Thus, the space between four nodes 113 in two adjacent rows is occupied by one node 113 of a given column. Conversely, the space between four nodes 113 in two adjacent columns is occupied by one node 113 of a given row.

The first and second layers of traces 115A and 115B couple each respective row or column of capacitive-sensing nodes 113 to control circuitry 120. The control circuitry 120 may include drive and sense circuitry coupled to the traces 115A and/or 115B. For example, drive circuitry may be used to apply a signal to a trace 115A for a certain column and sense circuitry may be used to sense a signal on a trace 115B for a certain row. The opposite application of applying and sensing signals may, of course, also be provided using the control circuitry 120.

It is known in the art to operate the sensing panel in at least two distinct modes.

A first mode, referred to herein as a self-capacitance mode, configures the control circuitry 120 to sense the capacitance between any given column or row of interconnected nodes 113 and a surrounding panel reference (for example, ground). By sensing a change in self-capacitance for a given column or row of interconnected nodes 113, the control circuitry 120 may detect a user touch or hover at or near that given column or row of interconnected nodes 113. Advantageously, self-capacitance mode sensing provides the best sensitivity for detecting a user hover. For example, a change in capacitance can be detected with respect to a hover in self-capacitance mode from as far as few centimeters from the surface of the sensing panel 100. Unfortunately, self-capacitance mode sensing is prone to a ghosting problem associated with a multi-touch/hover situation because the entire length of the given column or row of interconnected nodes 113 is used to sense and thus the control circuitry 120 is not able to unambiguously distinguish between different touch/hover instances falling along a same row or column.

A second mode, referred to herein as the mutual-capacitance mode, configures the control circuitry 120 to sense the capacitance at an intersection point between one column of interconnected nodes 113 and one row of interconnected nodes 113. By sensing a change in mutual-capacitance at a given intersection point between a column and row of interconnected nodes 113, the control circuitry 120 may detect a user touch or hover at or near that given intersection point. Advantageously, mutual-capacitance mode sensing provides the best sensitivity for detecting the particular location of a user touch or hover, and enables the control circuitry to distinguish between and identify the locations of multi-touch/hover situations. Unfortunately, mutual-capacitance mode has a weak sensitivity for detecting a user hover. For example, a change in capacitance can be detected with respect to a hover in mutual-capacitance mode from as far as only a few nanometers from the surface of the sensing panel 100.

The opposite advantages and disadvantages of self-capacitance mode and mutual-capacitance mode often lead the system designer to choose operation of the panel in one or the other mode based on whether the panel is being provided in an environment where hover detection (with a lack of accuracy) is preferred or an environment where touch detection (with accurate location) is preferred.

There is a need in the art for solutions which would enable a panel to support both self-capacitance mode and mutual-capacitance mode. For example, those skilled in art could configure the control circuitry 120 to operate in a time division multiplexed configuration which switches the sensing operation back and forth between self-capacitance mode and mutual-capacitance mode. This solution adds complexity to the design of the control circuitry 120 and may further compromise to some degree the sensitivity of the functional operation of each mode. Solutions which would support simultaneous self-capacitance and mutual-capacitance mode operation are preferred.

SUMMARY

In an embodiment, an apparatus comprises: a capacitive touch panel including: a first sensor pattern configured to operate in a mutual-capacitance detection mode of operation; and a second sensor pattern configured to operate in a self-capacitance detection mode of operation; wherein said first and second sensor patterns are supported by a support substrate one pattern on top of the other pattern.

In an embodiment, a capacitive touch panel apparatus comprises: a first layer of patterned conductive material forming a plurality of rows of electrically connected sensor nodes; a second layer of patterned conductive material forming a plurality of columns of electrically connected sensor nodes; a third layer of pattered conductive material forming a plurality of conductive islands; wherein each sensor node includes a central opening; and wherein each conductive island is positioned in vertical alignment with the central open region of a corresponding sensor node.

In an embodiment, an apparatus comprises: a capacitive touch panel including: a mutual-capacitance sensor pattern including a plurality of row conductors and a plurality of column conductors; and a self-capacitance sensor pattern including a plurality of clusters of conductive islands, each cluster including two or more conductive islands electrically connected by one or more conductor lines; wherein said mutual-capacitance and self-capacitance sensor patterns are supported by a support substrate one pattern on top of the other pattern.

The foregoing and other features and advantages of the present disclosure will become further apparent from the following detailed description of the embodiments, read in conjunction with the accompanying drawings. The detailed description and drawings are merely illustrative of the disclosure, rather than limiting the scope of the invention as defined by the appended claims and equivalents thereof.

BRIEF DESCRIPTION OF DRAWINGS

Embodiments are illustrated by way of example in the accompanying figures not necessarily drawn to scale, in which like numbers indicate similar parts, and in which.

DETAILED DESCRIPTION OF THE DRAWINGS

Figure 2:
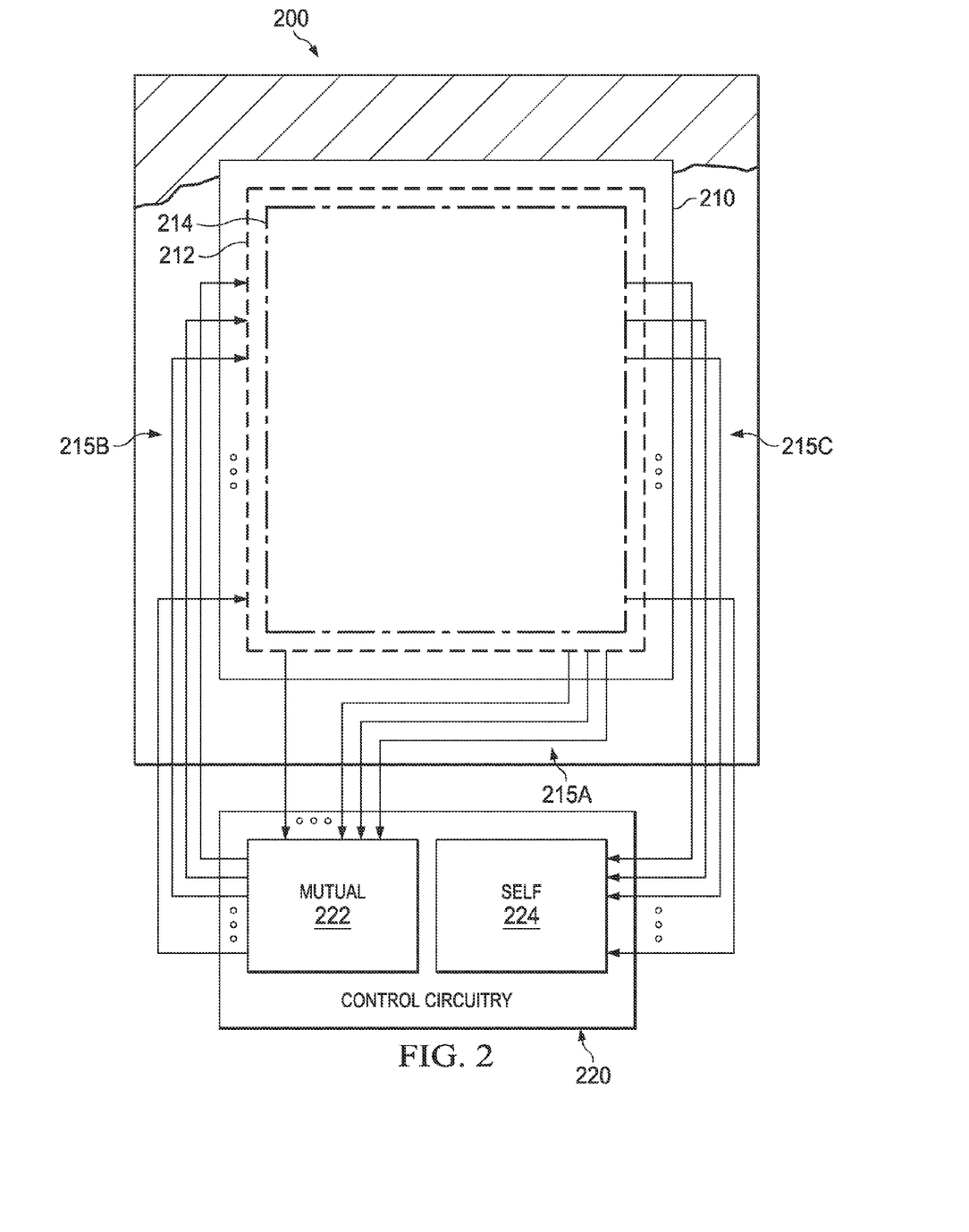
FIG. 2 illustrates a configuration for capacitive sensing panel of touchscreen.

FIG. 2 illustrates a configuration for a capacitive sensing panel 200 of touchscreen device. The capacitive sensing panel 200 is of a type which is typically provided in a touchscreen panel for an electronic device such as a smart phone, GPS device, tablet computer, mobile media player, remote control device, or any other devices capable of using a touchscreen panel. The sensing panel 200 includes an active portion 210 including a first sensor pattern 212 (indicated generally by the dash line outline) and a second sensor pattern 214 (indicated generally by the dash-dot line outline). The sensor patterns 212 and 214 are configured to assist in the detection of a user touch or hover (for example, through a finger or other body part as well as through a tool such as a stylus). In particular, the sensor pattern 212 is configured to assist with a mutual-capacitance mode of operation for the panel 200 while the sensor pattern 214 is configured to assist with a self-capacitance mode of operation for the panel 200. The sensor patterns are supported by a support substrate one pattern on top of the other pattern.

A first layer of traces 215A are provided to connect to column conductors which may include sensor nodes within the sensor pattern 212. These traces 215A are commonly referred to as Y-sense lines. A second layer of traces 215B are provided to connect to row conductors which may include sensor nodes within the sensor pattern 212. These traces 215B are commonly referred to as X-force lines. The X-force and Y-sense lines are associated with a mutual-capacitance mode of operation. A third layer of traces 215C are provided to connect to sensor nodes within the sensor pattern 214. These traces 215C are commonly referred to as self-sense lines. The self-sense lines are associated with a self-capacitance mode of operation.

The first and second layers of traces 215A and 215B couple each respective row conductor or column conductor (with sense nodes) of the sensor pattern 212 to a mutual-capacitance circuit 222 within control circuitry 220. The configuration and operation of the mutual-capacitance circuit 222 to apply a signal to the X-force lines and sense on the Y-sense lines to make a touch/hover detection is well known to those skilled in the art. The third layer of traces 215C couple respective sense nodes of the sensor pattern 214 to a self-capacitance circuit 224 within the control circuitry 220. The configuration and operation of the self-capacitance circuit 224 to sense on the self-sense lines to make a touch/hover detection is well known to those skilled in the art.

Figure 3:
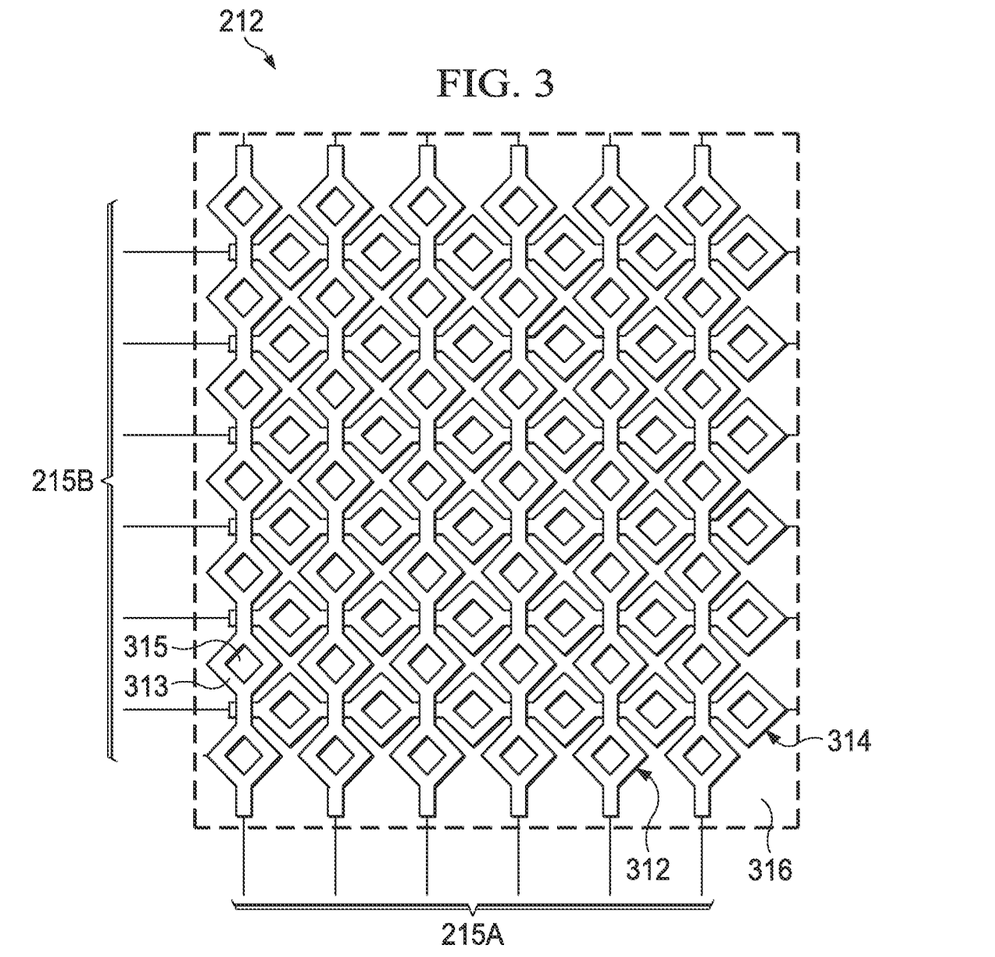
FIG. 3 illustrates an exemplary layout of a sensor pattern for mutual-capacitance sensing.

Reference is now made to FIG. 3 which illustrates an exemplary layout of the sensor pattern 212. The sensor pattern 212 is formed from multiple ITO layers, namely, first ITO layer 312 and second ITO layer 314, disposed within the perimeter of the active portion 210 (see, FIG. 2). The first and second ITO layers 312 and 314 are separated by a dielectric layer 316. The first ITO layer 312 is patterned to include conductive columns of interconnected capacitive-sensing nodes 313, and the first layer of traces 215A are coupled to each column of capacitive-sensing nodes 313 in the first ITO layer 312. The interconnected nodes 313 of any one column are isolated from the interconnected nodes 313 of any adjacent column. The second ITO layer 314 is patterned to include conductive rows of interconnected capacitive-sensing nodes 313, and the second layer of traces 215B are coupled to each row of capacitive-sensing nodes 313 in the second ITO layer 314. The interconnected nodes 313 of any one row are isolated from the interconnected nodes 313 of any adjacent row.

In the illustrated implementation, the interconnected nodes 313 have a diamond shape formed by a square rotated by forty-five degrees which allows for an interleaving of the row and column patterns to occupy a large surface area of the active portion 210. Thus, the space between four nodes 313 in two adjacent rows is occupied by one node 313 of a given column. Conversely, the space between four nodes 313 in two adjacent columns is occupied by one node 313 of a given row.

Each node 313 further includes a central opening 315 that is devoid of conductive material. Thus, the diamond shape for each node 313 may further be consider to form a square ring, with the square ring rotated by forty-five degrees. In this configuration, each conductive column of the sensor pattern 212 comprises a plurality of interconnected rings, each ring providing a sensor node 313. Likewise, each conductive row of the sensor pattern 212 comprises a plurality of interconnected rings, each ring providing a sensor node 313.

Figure 4:
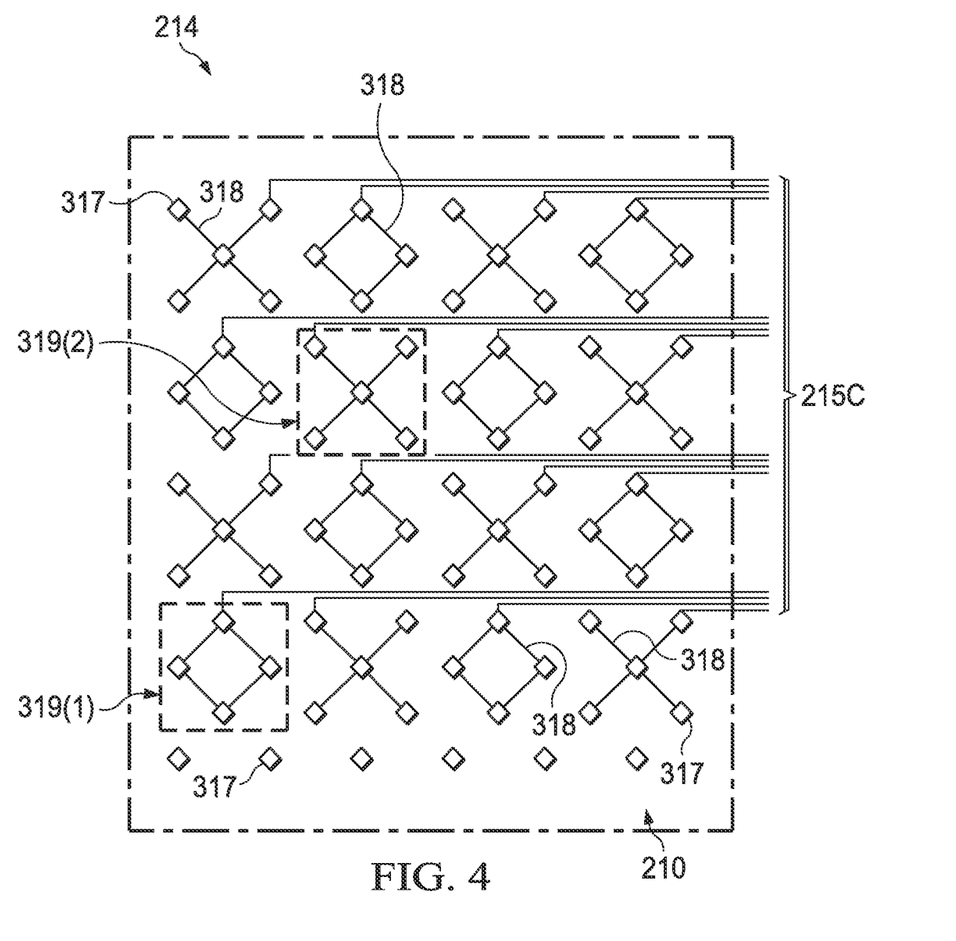
FIG. 4 illustrates an exemplary layout of a sensor pattern for self-capacitance sensing.

Reference is now made to FIG. 4 which illustrates an exemplary layout of the sensor pattern 214. The sensor pattern 214 is formed from a single ITO layer, namely, a third ITO layer 316, disposed within the perimeter of the active portion 210 (see, FIG. 2). The third ITO layer 316 is patterned to include a plurality of conductive islands 317. The islands are arranged in the form of a staggered array to correspond to the locations of the openings 315 in the sensor pattern 212 (see, FIG. 3). The patterning of the third ITO layer 316 further defines conducting lines 318 which interconnect a plurality of islands 317 to form a cluster 319 and still further define the third layer of traces 215C. The clustering of islands in terms of number of islands 317 per cluster 318 and the shape of the cluster is selectable by the panel designer. FIG. 4 illustrates the use of two different clusterings of islands 317. A first clustering arrangement includes four islands 317 forming a cluster 319(1). A second clustering arrangement includes five islands 317 forming a cluster 319(2). It will be understood that this is exemplary only, and that other clustering arrangements are possible.

Figure 5A:
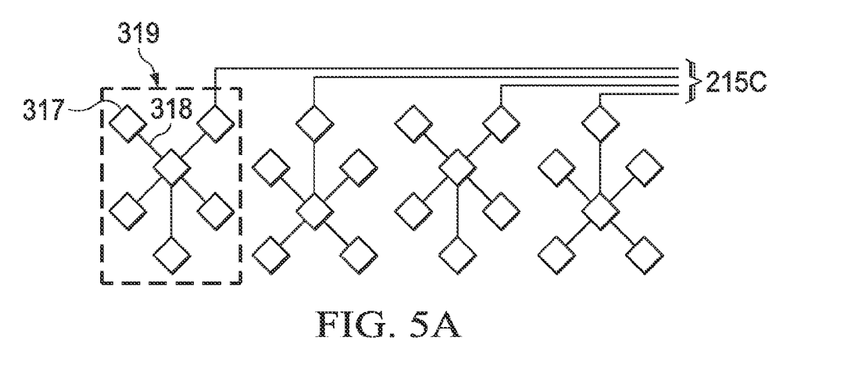
FIGS. 5A-5B illustrate alternative clustering arrangements for a self-capacitance sensor pattern.
Figure 5B:
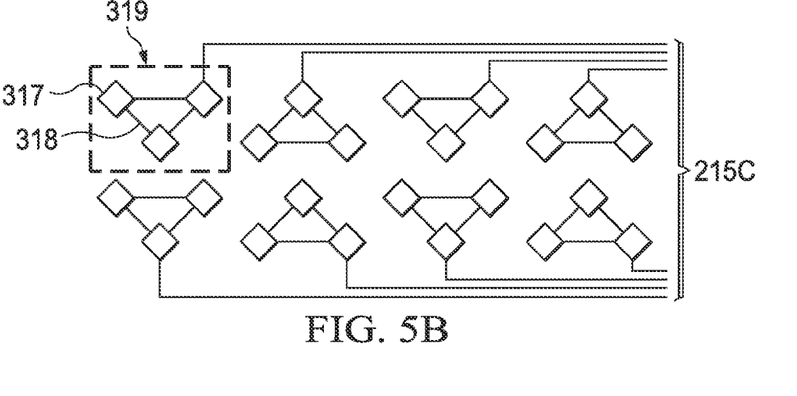

Reference is made to FIGS. 5A-5B for examples of different clustering arrangements. In FIG. 5A, each cluster 319 includes six islands 317 electrically connected by conducting lines 318 and further connected to the third layer of traces 215C. In FIG. 5B, each cluster 319 includes three islands 317 electrically connected by conducting lines 318 and further connected to the third layer of traces 215C. The number of islands 317 included within each cluster affects the position resolution of the self-capacitance measurement. The larger the number of included islands 317 per cluster 319, the lower (coarser) the position resolution. Conversely, the fewer the number of included islands per cluster 319, the higher (finer) the position resolution.

It will be further noted that with higher resolution, and more clusters 319, there is corresponding increase in the number of traces 215C. Routing of those traces within the active area can be a challenge. While FIGS. 2, 4, 5A and 5B illustrate the traces 215C exiting the active portion 210 on a common edge, it will be understood that this is by example only and that for higher resolution configurations with more traces 215C, the routing of those traces may need to exit from multiple edges of the active portion 210.

Figure 6:
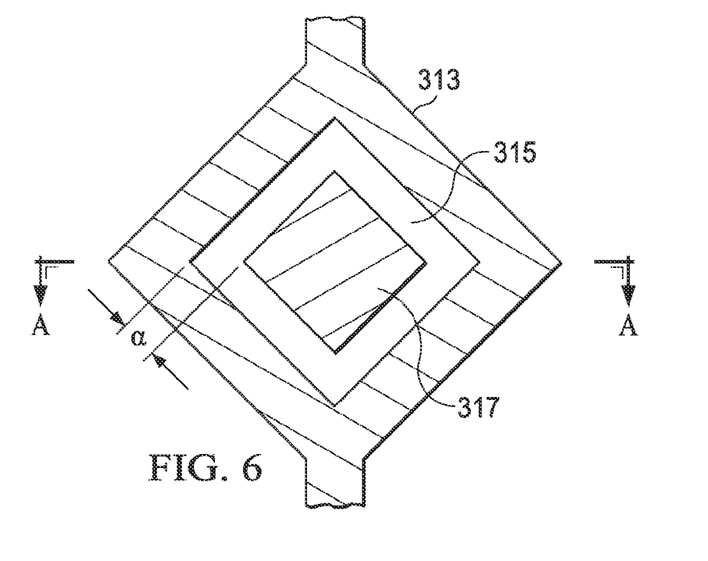
FIG. 6 illustrates a plan view of a portion of the capacitive sensing panel.

Reference is now made to FIG. 6 which illustrates a plan view of a small portion of the capacitive sensing panel 200 occupied by a single ring-shaped sensor node 313 and a single island 317 (where the island 317 is in vertical alignment with the opening 315 in the sensor node 313). It will be noted that the opening 315 in the sensor node 313 has an area larger that the area occupied by the island 317. Thus, there is annular separation between the inner edge of the opening 315 and the outer edge of the island 317. The separation distance d need not be very large, just sufficient to ensure electrical isolation. The illustration in FIG. 6 is somewhat simplified at least in that the conducting line(s) 318 for connecting the illustrated island 317 to other islands of a cluster 319 (see, FIGS. 4, 5A and 5B) is not shown. The location of such a conducting line 318 relative to the island 317 depends on that island's positional relationship to other islands in the cluster 319. Also not shown in FIG. 6 is the position of the trace 215C because it will be understood that this also depends on that island's positional relationship to other islands in the cluster 319 as well as that island's positional relationship with respect to trace routing paths relative to neighboring clusters.

Figure 7A:
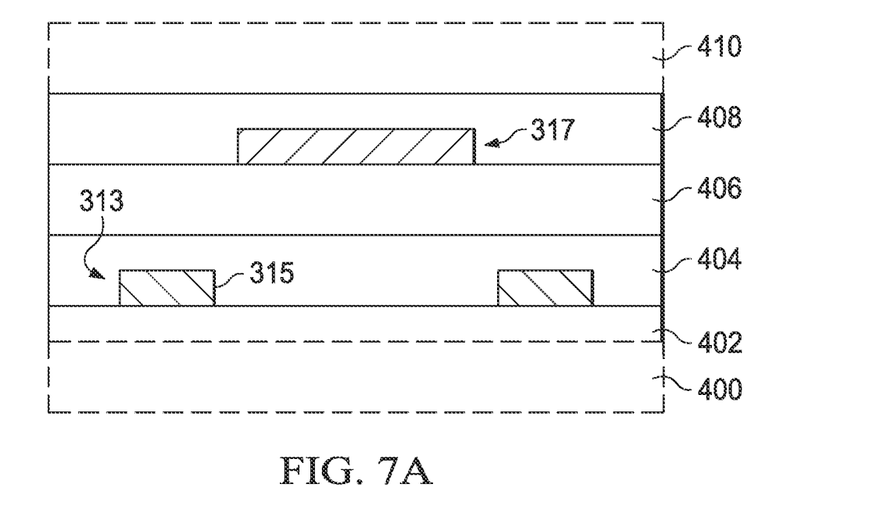
FIGS. 7A and 7B illustrate cross-sectional views of a portion of the capacitive sensing panel shown in FIG. 6.
Figure 7B:
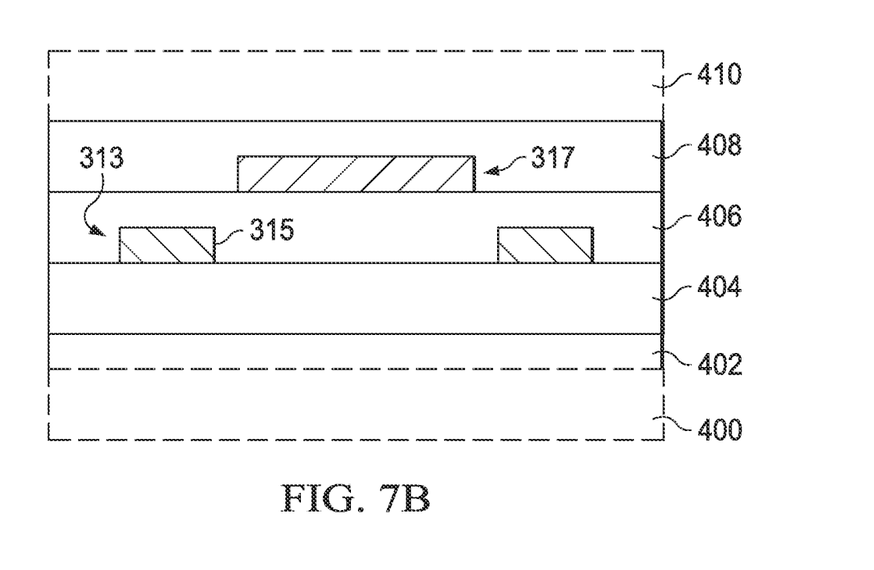

Reference is now made to FIGS. 7A and 7B which illustrate cross-sectional views (taken at position A-A) of a portion of the capacitive sensing panel 200 shown in FIG. 6. As known by those skilled in the art, the capacitive sensing panel 200 may be used in a touchscreen panel application where the capacitive sensing panel overlies a display panel. FIGS. 7A and 7B show, with a dotted box 400, the provision of the display panel, which may take on any suitable display format include LED, plasma, etc. A supporting substrate layer 402 is provided for the capacitive sensing panel 200. If the sensor node 313 is, for example, associated with a row of the panel 200, the patterned ITO layer is formed on the upper surface of the layer 402 as shown in FIG. 7A. The patterning of the ITO layer forms the ring shape with the opening 315. An insulating layer 404 is deposited to cover the patterned ITO layer and provide a flat top surface for further layers. It will be noted that FIG. 7B fails to show a patterned ITO layer within insulating layer 404 at this location due to the offset positioning of the sensor node 313 in rows and columns. If the sensor node 313 is, for example, associated with a column of the panel 200, the patterned ITO layer is formed on the upper surface of the layer 404 as shown in FIG. 7B. The patterning of the ITO layer forms the ring shape with the opening 315. An insulating layer 406 is deposited to cover the patterned ITO layer and provide a flat top surface for further layers. It will be noted that FIG. 7A fails to show a patterned ITO layer within insulating layer 406 at this location due to the offset positioning of the sensor node 313 in rows and columns. In both FIGS. 7A and 7B, for the row or column, the island 317 is provided by a patterned ITO layer formed on the upper surface of the layer 406 (such that the island 317 is in vertical alignment with the opening 315 of the sensor node 313). An insulating layer 408 is deposited to cover the patterned ITO layer and provide a flat top surface for further layers. In an embodiment, the capacitive sensing panel 200 further includes a protective layer 410, for example comprising a glass plate, over the layer 408.

The layered structure shown in FIGS. 7A and 7B is exemplary only. In an alternate embodiment, a single patterned ITO layer (covered by a single insulating layer) may be used to form all sensor nodes 313 (both for rows and columns), with another patterned ITO layer placed above (and covered by another insulating layer) to form all islands 317. It will be understood that bridge conductors on a different layer will be needed.

The positioning of the layer patterned to form the islands on top is merely exemplary, it being understood the that the particular level of each layer relative to other layers is within the discretion of the panel designer.

The configuration of FIGS. 2-6 advantageously provides a capacitive sensing panel which includes a first sensor pattern 212 configured to assist in the detection of a user touch in a mutual-capacitance mode of operation and a second sensor pattern 214 configured to assist in the detection of a user hover in a self-capacitance mode of operation. Through the control circuitry 220, these detections can be made simultaneously. The use of clusters 319 of islands 317 for the second sensor pattern 214 enables the hover to be sensed with position detection in instances where the first sensor patter 212 cannot detect a hovering condition.

An advantage of the disclosed implementation is that the design supports multiple finger touch detection (using the mutual sensing pattern) and multiple finger hover detection (using the self-sensing pattern). Thus, the design enables provision of very fine multi-touch accuracy and linearity owing to the mutual sensing operation as well as multi-hover capability with higher accuracy and linearity (due to the combining of multiple self-sense islands in a cluster along with operation of the mutual sensing).

The foregoing description has provided by way of exemplary and non-limiting examples a full and informative description of one or more exemplary embodiments of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. An apparatus, comprising:
 a capacitive touch panel including:
  a first sensor pattern configured to solely operate in a mutual-capacitance detection mode of operation, the first sensor pattern comprising:
   a plurality of rows of electrically connected sensor nodes; and
   a plurality of columns of electrically connected sensor nodes;
   wherein each sensor node in the rows and columns has a ring shape with a central open region; and
  a second sensor pattern configured to solely operate in a self-capacitance detection mode of operation;
  wherein said first and second sensor patterns are supported by a support substrate one pattern on top of the other pattern;
  wherein the second sensor pattern comprises a plurality of conductive islands, each conductive island positioned in vertical alignment perpendicular to the support substrate with the central open region of the sensor node; and
  wherein the plurality of conductive islands are divided into a plurality of clusters, each cluster including two or more conductive islands which are electrically connected to each other by one or more conductive lines.

2. The apparatus of claim 1, further comprising:
 a control circuit coupled to the capacitive touch panel and including:
  a mutual-capacitance sensing circuit electrically coupled to the first sensor pattern; and
  a self-capacitance sensing circuit electrically coupled to the second sensor pattern.

3. The apparatus of claim 1, wherein the ring shape of each sensor node has a square shape, and each central opening has a square shape and each island has a square shape.

4. An apparatus, comprising:
 a capacitive touch panel including:
  a first sensor pattern configured to operate in a mutual-capacitance detection mode of operation; and
  a second sensor pattern configured to operate in a self-capacitance detection mode of operation;
  wherein said first and second sensor patterns are supported by a support substrate one pattern on top of the other pattern;
  wherein the first sensor pattern comprises:
   a plurality of row conductors; and
   a plurality of column conductors; and
  wherein the second sensor pattern comprises:
   a plurality of conductive islands; and
   wherein the plurality of conductive islands are divided into a plurality of clusters, each cluster including two or more conductive islands which are electrically connected to each other by one or more conductive lines.

5. The apparatus of claim 4, wherein each cluster of electrically connected conductive islands is electrically isolated from other clusters.

6. The apparatus of claim 5, wherein each row and column conductor includes a plurality of openings, and wherein each conductive island is positioned in vertical alignment with a corresponding one of the openings.

7. The apparatus of claim 4, further comprising:
 a control circuit coupled to the capacitive touch panel and including:
  a mutual-capacitance sensing circuit including a first set of traces electrically coupled to the plurality of row conductors and a second set of traces electrically coupled to the plurality of column conductors; and
  a self-capacitance sensing circuit including a third set of traces electrically coupled to the plurality of clusters.

8. The apparatus of claim 4, wherein each cluster includes a same number of electrically connected conductive islands.

9. The apparatus of claim 4, wherein the clusters comprise:
 first clusters each having a first number of electrically connected conductive islands; and
 second clusters each having a second number of electrically connected conductive islands different from the first number.

10. A capacitive touch panel apparatus, comprising:
 a first layer of patterned conductive material forming a plurality of rows of electrically connected sensor nodes;
 a second layer of patterned conductive material forming a plurality of columns of electrically connected sensor nodes;
 a third layer of pattered conductive material forming a plurality of conductive islands;
 wherein each sensor node includes a central opening; and
 wherein each conductive island is positioned in vertical alignment with the central open region of a corresponding sensor node.

11. The apparatus of claim 10, wherein the rows of electrically connected sensor nodes and columns of electrically connected sensor nodes form a first sensor pattern configured to operate in a mutual-capacitance detection mode of operation.

12. The apparatus of claim 10, wherein the plurality of conductive islands are divided into a plurality of clusters, each cluster including two or more conductive islands which are electrically connected to each other by one or more conductive lines.

13. The apparatus of claim 12, wherein the plurality of clusters form a second sensor pattern configured to operate in a self-capacitance detection mode of operation.

14. The apparatus of claim 10, wherein the first, second and third layers of patterned conductive material are supported by a support substrate with the layers configured on top of each other.

15. The apparatus of claim 10, further comprising:
 a control circuit including:
  a mutual-capacitance sensing circuit electrically coupled to the rows of electrically connected sensor nodes and columns of electrically connected sensor nodes which form a mutual-capacitance sensor pattern; and a self-capacitance sensing circuit electrically coupled to the plurality of conductive islands which form a self-capacitance sensor pattern.

16. An apparatus, comprising:
a capacitive touch panel including:
   a mutual-capacitance sensor pattern including a plurality of row conductors and a plurality of column conductors; and
   a self-capacitance sensor pattern including a plurality of clusters of conductive islands, each cluster including two or more conductive islands electrically connected by one or more conductor lines;
wherein said mutual-capacitance and self-capacitance sensor patterns are supported by a support substrate one pattern on top of the other pattern;
wherein each row conductor and each column conductor of the mutual-capacitance sensor pattern includes a plurality of openings; and wherein each conductive island is positioned in vertical alignment perpendicular to the support substrate with a corresponding opening in the row and column conductors.

17. An apparatus, comprising:
a capacitive touch panel including:
   a mutual-capacitance sensor pattern including a plurality of row conductors and a plurality of column conductors;
   a self-capacitance sensor pattern including a plurality of clusters of conductive islands, each cluster including two or more conductive islands electrically connected by one or more conductor lines;
wherein said mutual-capacitance and self-capacitance sensor patterns are supported by a support substrate one pattern on top of the other pattern; and
a control circuit including:
   a mutual-capacitance sensing circuit electrically coupled to the row and column conductors which form the mutual-capacitance sensor pattern; and
   a self-capacitance sensing circuit electrically coupled to the clusters of conductive islands which form the self-capacitance sensor pattern.

* * * * *